Figure 1:
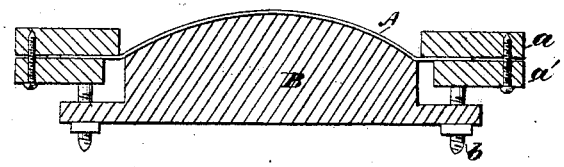

D. B. SPOONER.

Manufacturing Rubber Diaphragms for Water-Meters.

No. 145,762. Patented Dec. 23, 1873.

Witnesses:
H. Carlin Clark.
Richard N. Dyer.

Inventor.
David B. Spooner
by Dyer, Beadle & Co.
Attys.

AM. PHOTO-LITHOGRAPHIC Co. N.Y. (OSBORNE'S PROCESS)

UNITED STATES PATENT OFFICE.

D. BRAINERD SPOONER, OF SYRACUSE, NEW YORK.

IMPROVEMENT IN MANUFACTURING RUBBER DIAPHRAGMS FOR WATER-METERS.

Specification forming part of Letters Patent No. 145,762, dated December 23, 1873; application filed January 18, 1873.

*To all whom it may concern:*

Be it known that I, DAVID B. SPOONER, of Syracuse, in the county of Onondaga and State of New York, have invented a new and useful Method of Manufacturing Diaphragms for Water-Meters; and I do hereby declare that the following is a full and exact description of the same, reference being had to the accompanying drawings, and to the letters of reference marked thereon.

This invention relates particularly to the manufacture of rubber diaphragms for water-meters; but it may be employed for other purposes; and consists, mainly, in treating vulcanized sheet rubber or other vulcanized gum, which has been temporarily held in a desired shape or position by any suitable means, with heat of such temperature as will cause it to permanently assume the shape which has been given to it, as will be fully described hereinafter.

In the drawings are represented views, in elevation, of certain devices employed for holding the rubber temporarily while being heated.

A represents the diaphragm of vulcanized rubber or vulcanized gum, which is first cut from the manufactured sheet, of such shape as it is desired to give it, and then secured at its edges between the rings $a$ $a'$. B represents a former, which is adjusted relatively to the rings by means of the threaded rods and nuts $b$, as shown, or in any other proper manner.

Figure 2:
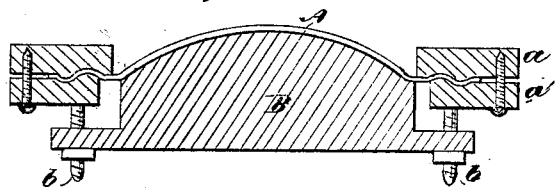
Figure 3:
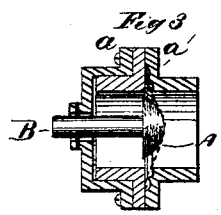
Figure 4:
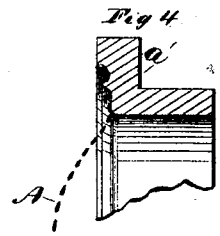

If desired, the diaphragm may be corrugated by providing the rings with corrugations, as shown in Figure 2.

If desired, also, one portion of the diaphragm may be made thicker than another by making indentations at the proper points in the holding formers.

After the vulcanized rubber is properly secured and stretched in the holding device, it is subjected to the proper degree of heat, by which means it is caused to assume permanently the form in which it is held.

The described device is especially adapted for making rubber diaphragms for water-meters; but the principle of my invention can be employed for other analogous purposes.

By means of my invention perfect diaphragms can be readily and cheaply made, while by the old method of vulcanizing and molding them at the same time, it was impossible to obtain one that was absolutely perfect.

Diaphragms produced by this method are uniform and regular in size and thickness, while those produced by the old method varied so greatly as to make them practically valueless. In consequence of this difference in uniformity these diaphragms can be easily distinguished from those that are molded.

Having thus fully described my invention, what I claim as new, and desire to secure by Letters Patent, is—

1. The described method of treating vulcanized sheet rubber or vulcanized gum, consisting in holding the sheet in a desired position to give it the requisite form by means of a mold or formers, as described, and subjecting the same to proper heat, as and for the purpose set forth.

2. The diaphragm formed of vulcanized sheet rubber, substantially as described, as a new article of manufacture.

This specification signed and witnessed this 30th day of December, 1872.

D. B. SPOONER.

Witnesses:
C. W. SMITH,
CLINTON SMITH.